US010656787B2

(12) United States Patent
Hill

(10) Patent No.: US 10,656,787 B2
(45) Date of Patent: May 19, 2020

(54) TOUCH TARGET OPTIMIZATION SYSTEM

(71) Applicant: Amazon Technologies, Inc., Seattle, WA (US)

(72) Inventor: Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 668 days.

(21) Appl. No.: 14/472,017

(22) Filed: Aug. 28, 2014

(65) Prior Publication Data

US 2014/0372947 A1    Dec. 18, 2014

Related U.S. Application Data

(63) Continuation of application No. 13/479,155, filed on May 23, 2012, now Pat. No. 8,823,667.

(51) Int. Cl.
| | | |
|---|---|---|
| *G06F 3/00* | (2006.01) | |
| *G06F 3/0482* | (2013.01) | |
| *G06F 16/957* | (2019.01) | |
| *G06F 3/0484* | (2013.01) | |
| *G06F 3/0488* | (2013.01) | |

(52) U.S. Cl.
CPC .......... *G06F 3/0482* (2013.01); *G06F 3/0488* (2013.01); *G06F 3/04842* (2013.01); *G06F 16/9577* (2019.01); *G06F 3/00* (2013.01)

(58) Field of Classification Search
CPC ............. G06F 3/00; G06F 3/033; G06F 3/048
USPC ................... 715/715, 808, 863, 831
See application file for complete search history.

(56) References Cited

U.S. PATENT DOCUMENTS

| | | | | |
|---|---|---|---|---|
| 2002/0112082 A1* | 8/2002 | Ko | ..................... | G06F 17/30899 709/246 |
| 2005/0071864 A1* | 3/2005 | Denoue | .................. | H04N 21/40 725/9 |
| 2008/0222283 A1 | 9/2008 | Ertugrul et al. | | |
| 2008/0295018 A1* | 11/2008 | Nurmi | ............... | G06F 17/30899 715/780 |
| 2009/0031426 A1* | 1/2009 | Dal Lago | ............ | G06F 21/6245 726/26 |
| 2009/0128505 A1 | 5/2009 | Partridge et al. | | |

(Continued)

FOREIGN PATENT DOCUMENTS

| | | |
|---|---|---|
| EP | 0575146 A2 | 12/1993 |
| EP | 2077493 A2 | 8/2009 |

OTHER PUBLICATIONS

Wroblewski, Luke, "Touch Target Sizes," LukeW Ideation + Design (May 4, 2010), downloaded from www.lukew.com/ff/entry.asp?1085, in 3 pages (of-record in parent application).

*Primary Examiner* — Steven P Sax
*Assistant Examiner* — Le Nguyen
(74) *Attorney, Agent, or Firm* — Knobbe, Martens, Olson & Bear, LLP

(57) ABSTRACT

A system is disclosed that improves the ability for users to select links and/or other display elements via a touch screen, such as the touch screen of a smartphone, tablet, or other mobile device. The system achieves this effect by adjusting the sizes and/or shapes of the touch targets associated with particular display elements. For example, if a particular link on a web page is determined to be difficult to select via a touch screen (based on monitored user behaviors and/or based on an automated analysis of page content), the touch target associated with the link may be increased in size.

19 Claims, 6 Drawing Sheets

(56) References Cited

U.S. PATENT DOCUMENTS

| | | | |
|---|---|---|---|
| 2009/0172560 A1 | 7/2009 | Cole et al. | |
| 2009/0303187 A1* | 12/2009 | Pallakoff | G06F 3/04886 345/169 |
| 2010/0066764 A1* | 3/2010 | Refai | G06F 3/04886 345/660 |
| 2010/0241507 A1* | 9/2010 | Quinn | G06Q 30/02 705/14.42 |
| 2010/0281408 A1* | 11/2010 | Fujioka | G06F 3/04817 715/765 |
| 2011/0050575 A1 | 3/2011 | Krahenbuhl et al. | |
| 2011/0131479 A1* | 6/2011 | Padgett | G06F 3/04895 715/223 |
| 2011/0302488 A1* | 12/2011 | Lee | G06F 3/0481 715/243 |
| 2012/0169613 A1* | 7/2012 | Armstrong | G06F 3/04886 345/173 |
| 2012/0278179 A1 | 11/2012 | Campbell et al. | |
| 2012/0278725 A1* | 11/2012 | Gordon | H04N 21/2665 715/738 |
| 2013/0191781 A1 | 7/2013 | Radakovitz et al. | |
| 2013/0246904 A1* | 9/2013 | Seliger | G06F 3/0481 715/234 |
| 2013/0305174 A1* | 11/2013 | Kim | G06F 3/0488 715/765 |

* cited by examiner

TOUCH TARGET OPTIMIZATION SYSTEM

PRIORITY CLAIM

This application is a continuation of U.S. application Ser. No. 13/479,155, filed May 23, 2012, the disclosure of which is hereby incorporated by reference.

BACKGROUND

Devices with touch screens have become increasingly popular. Touch screens are widely used on smart phones, tablets, e-book reader devices, other types of mobile devices, and even personal computers, to name a few. Touch screen user interfaces can come in various types, sizes, and display resolutions, making uniformity in user interaction and user experience difficult to achieve. For example, web pages present a unique challenge because the same web page can be viewed on various touch screen devices at different sizes and resolutions. When users browse web pages with a touch screen device, some links can be very difficult to select by touch. For example, a particular page may have a large number of links in a concentrated area, making it difficult to select a desired link without first zooming in on the area. This problem is especially significant for small form-factor devices, such as phones, and for users with relatively large fingers.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Overview

Figure 1:
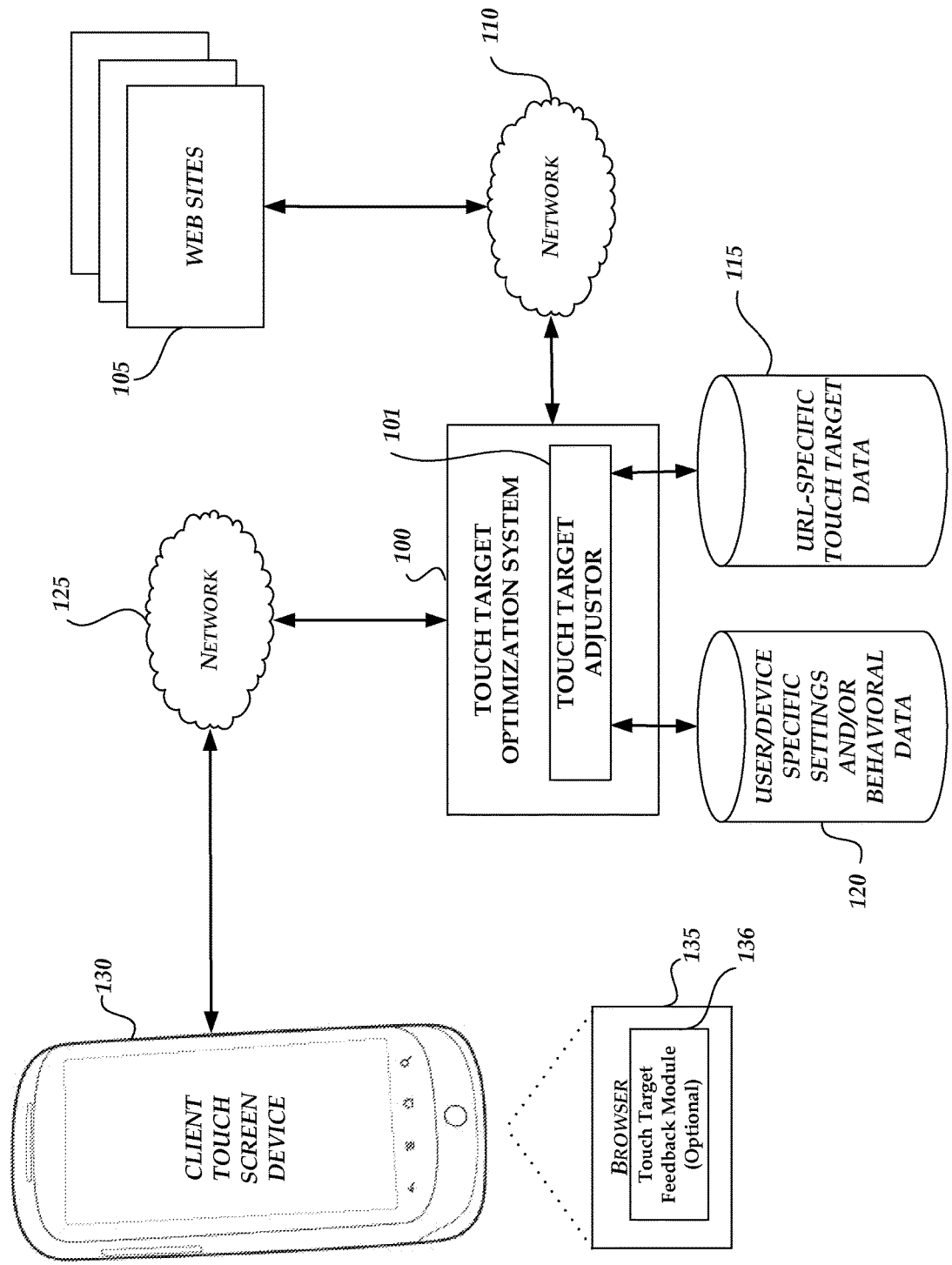
FIG. 1 illustrates the general architecture of a touch target optimization system according to one embodiment of the invention.

The present disclosure provides a system and methods for adjusting the sizes and/or shapes of touch targets on web pages (and/or on other documents or display objects) displayed on touch screen devices. The touch target adjustments may be made dynamically on the user device, and/or on a proxy server or system that acts as an intermediary between the user device and content servers. The touch target adjustments can, for example, be based on any one or more of the following: (1) a real-time or previously-performed analysis of the page's content, (2) physical parameters, such as the screen size and resolution, of the particular user device, (3) monitored behaviors of the user(s) of the particular user device, (4) monitored behaviors of users who have accessed this particular page, (5) configuration settings specified by a user of the particular device, (6) the popularity levels of particular links on a page relative to others. (All combinations of the forgoing six factors/criteria are contemplated and intended to be supported by this disclosure.) These and other factors may be used both to determine whether to modify the size and/or shape of a touch target, and to determine the extent or degree of the modification (e.g., the percent of size increase).

The touch targets to which the adjustments are made can include, or can be associated with, various types of user-selectable display elements such as textual links, graphical links, buttons, images, icons, check boxes, drop down boxes, text entry fields, and controls for scrolling. The sizes and/or shapes of the touch targets may be optimized (optionally without modifying the sizes, shapes and appearances of the underlying display elements) to overcome various potential negative user experiences that can result from, for example, activating the incorrect user-selectable element, leading to unintended or undesired outcomes. In some cases, the touch target adjustments may reduce the need for users to zoom-in on particular regions of pages before selecting associated display elements.

For purposes of illustration, the invention will be described primarily in the context of web pages viewed by a browser. As will be recognized, however, the invention is also applicable to other types of documents and display objects, and is applicable to other types of mobile applications capable of displaying content with touch targets. Depending on the context of its use, the term "touch target," as used herein, may refer to an actual touch target, the underlying user-selectable element, and/or to the associated size and/or shape. The adjustments described herein may be viewed as being relative to the original or default touch target sizes and shapes that would be used on the user device if no touch target adjustments were made.

Touch targets can be adjusted, or optimized, in various ways, all of which are covered by this disclosure. For example, touch targets may be optimized depending upon the particular layout of a web page (e.g., whether there are many links positioned very closely together). Touch targets can also be optimized depending upon the display resolution of the device (e.g., touch targets may be adjusted differently for low-resolution screens than for high-resolution screens). In some implementations, touch targets may also be optimized based user behavioral data, which can be collected and analyzed to identify recurring patterns; for example, touch target feedback data may reveal that mobile device users (or users of a particular type of device) frequently have trouble selecting a particular link on a particular page. In some embodiments, such user interaction or behavioral data may be user-specific (e.g. for a particular user of a device), device-specific (e.g. for all users of a particular device), URL-specific (e.g. for multiple users who view a web page from a particular URL, regardless of device), or any combination thereof.

In some embodiments, the size of a particular touch target may be increased if the system determines that the underlying link for that touch target is the most likely link to be selected by a user viewing the web page. For example, the system may determine that a touch target corresponding to a "Search" button on a page should be larger in relation to the surrounding elements because this button is highly likely to be activated by a user (based, e.g., on this user's past behaviors and/or the monitored behaviors of others who have accessed the page). If the touch target for the "Search" button is too small, it may be difficult for the user to activate, which can increase user frustration and detract from the user experience. In another example, the system may determine that a touch target corresponding to less "popular" links on a web page should be smaller in relation to the rest of the web page in order to decrease the likelihood of the user accidentally selected an undesired link.

In some embodiments, the size of a touch target on a loaded page may be modified based on the user's current context on that page. For example, if a user starts entering text into a search box, the associated "Search" button may be enlarged in anticipation of its selection. This may be accomplished by, for example, execution of JavaScript that is added to the page by the touch target optimization system, or by a special browser or browser component that monitors the user's actions on the page.

The touch target optimization system may also include methods and processes to evaluate a user's selection of a touch target when multiple touch targets are involved. For example, for a web page with a large number of user-selectable elements relatively close together, the touch target optimization system may evaluate a user's touch selection by determining the touch target for which the greatest area was touched. Thus, for example, if two-thirds of a user's touch area corresponds to a first link, and the remaining one-third of the user's touch area corresponds to a second link, the touch target optimization system may determine that the user intended to activate the first link, and not the second link.

In some implementations, touch target optimization may also use of user preferences or settings, which may be customized on a per-user or per-device level. For example, a user may be provided options to configure the touch target optimization system to increase the size of certain types of touch targets (e.g., buttons, tabs, display elements falling below a particular size threshold, etc.). Other user configuration settings for touch targets may include, for example, (1) a setting to automatically magnify touch targets as large as possible, (2) a setting to enlarge relatively popular links or display elements, (3) an option to enable the system to adapt over time based on the user's monitored behaviors, (4) a setting or option to configure touch settings through an interactive training sequence in which the user is prompted to touch various elements on the screen, and (5) an option to specify the user's finger size. (Any one or more of the forgoing configuration options can be used in a given embodiment, and all possible combinations are contemplated and intended to be supported by this disclosure.) The user settings may be modified or reset at any time to suit the user's preferences, or, for example, to reset for use by a different user. The user settings may be stored on the user device (optionally with different configuration settings for different users), and/or may be stored on a proxy server that uses the settings to make touch target adjustments.

Various aspects of the system will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims.

Proxy Server Embodiment

FIG. 1 illustrates an embodiment in which the touch target optimization system 100, or some of its components, runs on a proxy server or other intermediate system that logically sits between the user devices 130 (one shown) and web sites/servers 105. In other embodiments, the components of the touch target optimization system may reside entirely on the user devices 130 (see FIG. 6, discussed below). Various hybrids and modifications of these two approaches are possible.

In the embodiment depicted in FIG. 1, the touch target optimization system 100 includes a touch target adjustor 101, configured to execute the methods for touch target optimization and adjustment as described herein. The touch target adjustor 101 may receive web pages from web sites 105 over the network 110 and analyze the web pages to adjust and/or optimize the touch targets, for example as described in the logical flow diagrams of FIGS. 2 and 3. As illustrated, the touch target adjustor 101 may access one or more data sources, such as a URL-specific touch target data source 115 and/or a user/device specific settings and/or behavioral data source 120. In some implementations, these data sources may be components or modules within the touch target optimization system 100. The touch target adjustor 101 can retrieve data from these and other data sources not depicted in FIG. 1 to analyze and adjust the touch targets of the web pages (and possibly other types of documents, such as PDF documents, Word documents, etc.) received from web sites 105.

For example, in some implementations the touch target adjustor 101 may use the URL of a requested web page to retrieve touch target data specific to that URL from the URL-specific touch target data repository 115. In some implementations, the touch target adjustor 101 may determine that a web page request originated from a particular user or client touch screen device 130, and retrieve touch target data specific to the user and/or user device 130 from the user/device specific settings and/or behavioral data 120.

The touch target adjustor 101 may also be configured to store data in the URL-specific touch target data source 115 and/or a user/device specific settings and/or behavioral data source 120, and other data sources not depicted in FIG. 1. For example, in some implementations the touch target adjustor 101 may determine the optimal touch target parameters (e.g. size and shape) for a particular URL for a web page and store the optimal touch target data specific to that URL at the URL-specific touch target data 115. In some implementations, the touch target adjustor 101 may determine the optimal touch target parameters (e.g. size and shape) for a particular user or client touch screen device 130, and store touch target data specific to the user and/or client touch screen device 130 at the user/device specific settings and/or behavioral data 120.

As further illustrated in FIG. 1, the client touch screen device 130 may comprise a browser 135 for displaying web pages received from the touch target optimization system 100 over the network 125. In some implementations, the client touch screen device 130 may receive the web pages directly from web sites 105.

In some embodiments, the browser 135 may include a touch target feedback module 136 as shown in FIG. 1, or web pages may be augmented to include such a module (e.g., written in JavaScript). The touch target feedback module 136 may be configured to collect data and/or analyze touch target responses and user behavior, and provide the data to the touch target optimization system 100, which can then store the data in the data sources 115, 120. As one example, when a user of the device 130 zooms-in on a page and then clicks on a link in the zoomed in region, the feedback module 136 may report some or all of the following event data to the optimization system 100: (1) an identifier of the device or device type, (2) the URL of the page being viewed, (3) a URL or other identifier associated with the selected link, (4) the zoom level at the time of the selection, (5) whether the user failed to properly select the link one or more times, and (6) the touch target size. In some embodiments, the feedback module 135 may be provided as, or as part of, a browser toolbar or other browser plug-in or add-on.

The touch target feedback module 136 may also be capable of detecting, for example, that a user consistently touches too high, too low, or to a particular side, of the desired element. This information may be used to extend a touch targets so as to encompass the screen areas that will likely be touched by the user.

The touch target optimization 100 may analyze the collected event data associated with a particular URL across many users, and based on this analysis, make decisions regarding touch target adjustments that should be made. For instance, the system 100 may determine that the touch target size associated with a particular link on a particular page should be increased (or should be increased for particular classes of users or devices) if one or more of the following conditions is met: (1) more than a threshold percentage of users zoom-in before selecting the link, (2) more than a threshold percentage of users fail to properly select the link, (3) the link is the most popular link on the page. (These and other factors, as well as others, may be used individually or in any combination.) The results of these types of analyses may be cached in the URL-specific data repository 115, and used to make on-the-fly adjustments as pages are retrieved. The adjustor 101 may modify the touch target's size and/or shape by modifying the displayable page content (e.g., to increase the display size of an associated element), and/or by conveying information to the browser 135 (e.g., by embedding such information in the page or by transmitting via a separate page information file) that causes the browser to modify the default size and/or shape of the display element's touch target.

For example, in one implementation of FIG. 1, metadata containing information about the touch targets for the page may be transmitted to the browser 135, causing the browser to modify the touch targets according to the metadata. The metadata may, for example, include aggregate or general touch target adjustment parameters which apply across all users, using data retrieved from, for example, the URL-specific touch target data source 115. The metadata may also include user or device specific touch target adjustment parameters, using data retrieved from, for example, the user/device specific settings and/or behavioral data source 120. In this example, touch target settings may be transmitted to a user across different devices. In another implementation of FIG. 1, the size and/or shape of the display elements of a page may be modified by the adjustor 101, and the modified page content is then transmitted to the browser 135, optionally with or without metadata about the adjusted touch targets.

In some cases, a page may be modified, for example by the adjustor 101 and/or the browser 135, such that the appearance or visual display of the page (and/or the selectable display elements of the page) are not modified with the touch targets—e.g., the original page and the page modified with touch target adjustments would appear identical on screen to the user. In other cases, the visual display of the page may be modified, for example by the adjustor 101 and/or the browser 135, such that the selectable display elements may be adjusted (e.g. resized and/or reshaped) according to the parameters of the touch targets—e.g. the original page and the page modified with touch target adjustments would appear differently on screen to the user. As these different scenarios illustrate, a page modified by the touch target optimization system 100 may or may not be displayed with a visual indication of the modified touch targets.

Although not shown in FIG. 1, the touch target optimization system 100 may include a document cache that caches modified pages. For example, when one or more touch target modifications are made to a particular page, the modified page may be stored in the document cache and used to service subsequent request for the page. Further, different versions of the page (with different touch target modifications) may be generated and cached for different classes of devices or users; for example, both a "tablet version" and a "smartphone version" may be generated and cached to account for the differences in the screen sizes of these two types of devices. The system 100 may also be capable of prefetching and pre-modifying pages in anticipation of requests from users.

As will be recognized, many of the components shown in FIG. 1 can be omitted. For example, the system 100 can operate without receiving any touch target feedback from the user devices 130, in which case the feedback module 136 can be omitted. As another example, the system 100 could operate without maintaining any URL-specific data 115, and/or without using user/device settings or behavioral data; for instance, the system could modify touch targets based solely on an analysis of the page content being retrieved.

The touch target optimization system 100 may be implemented on or as a computing system that comprises one or more computing devices (e.g., physical servers), each of which includes one or more processors and a memory. The touch target optimization functionality described herein may be implemented partly or entirely within code modules executed by the computing system. The computing system preferably acts as a proxy server by making content requests on behalf of user devices 130. The computing system/proxy server may also perform various other functions associated with the retrieval of content, such as caching frequently accessed content (as mentioned above), predictively prefetching content, rendering or partially rendering requested pages, filtering out or modifying display objects, and/or otherwise modifying the requested pages for display on small form-factor displays.

In some cases, the touch target optimization system 100 may be associated with a special browser 135 (or browser-plug-in) that is pre-configured to interact with the optimization system 100. In other cases, any browser may be used, and the browser may be configured by the end user to use the touch target optimization system 100 as a proxy server.

Examples of Methods Performed by Touch Target Optimization System

Figure 2:
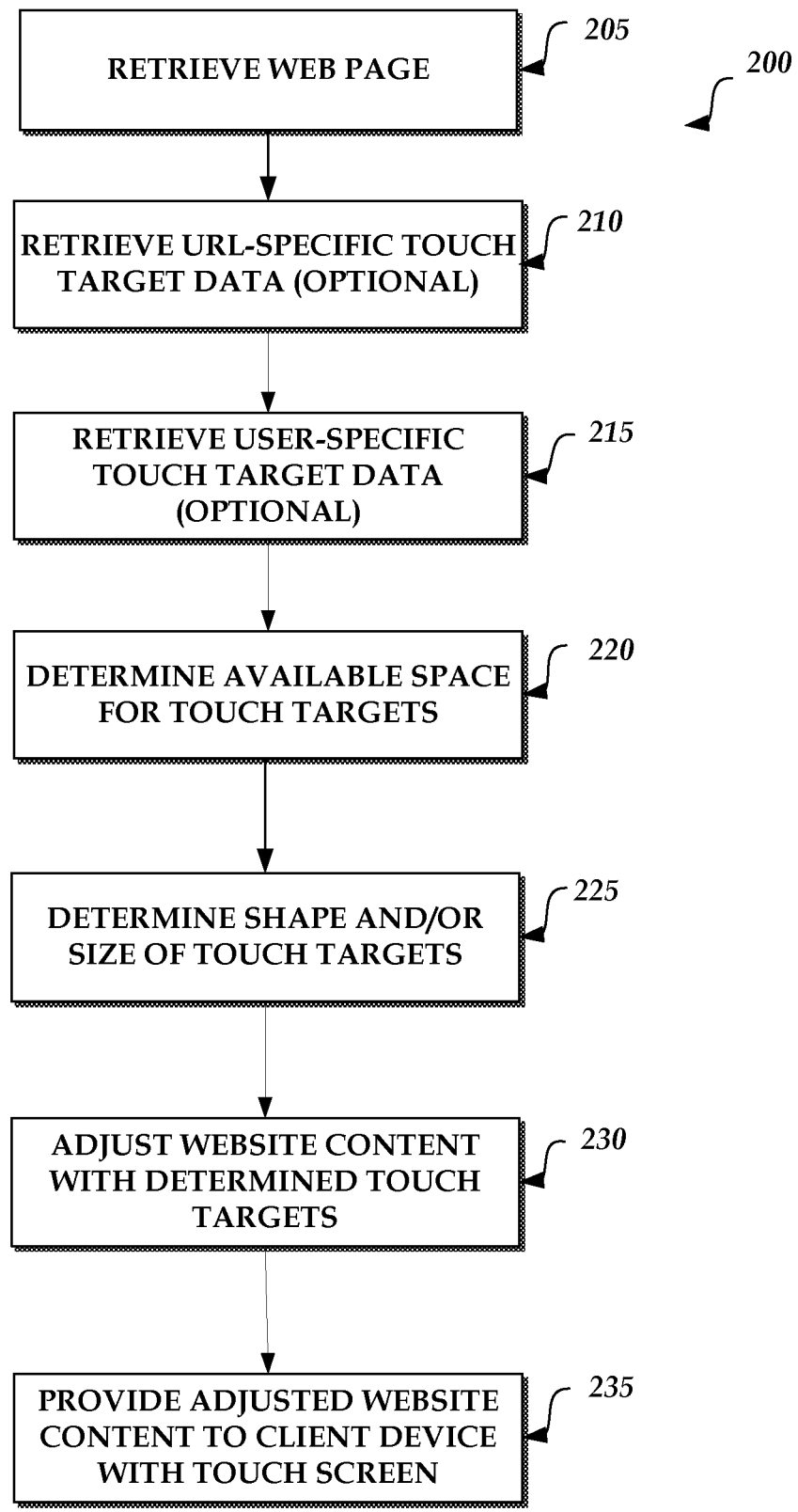
FIG. 2 schematically illustrates a logical flow diagram for a touch target optimization scenario involving the touch target optimization system of FIG. 1.
Figure 3:
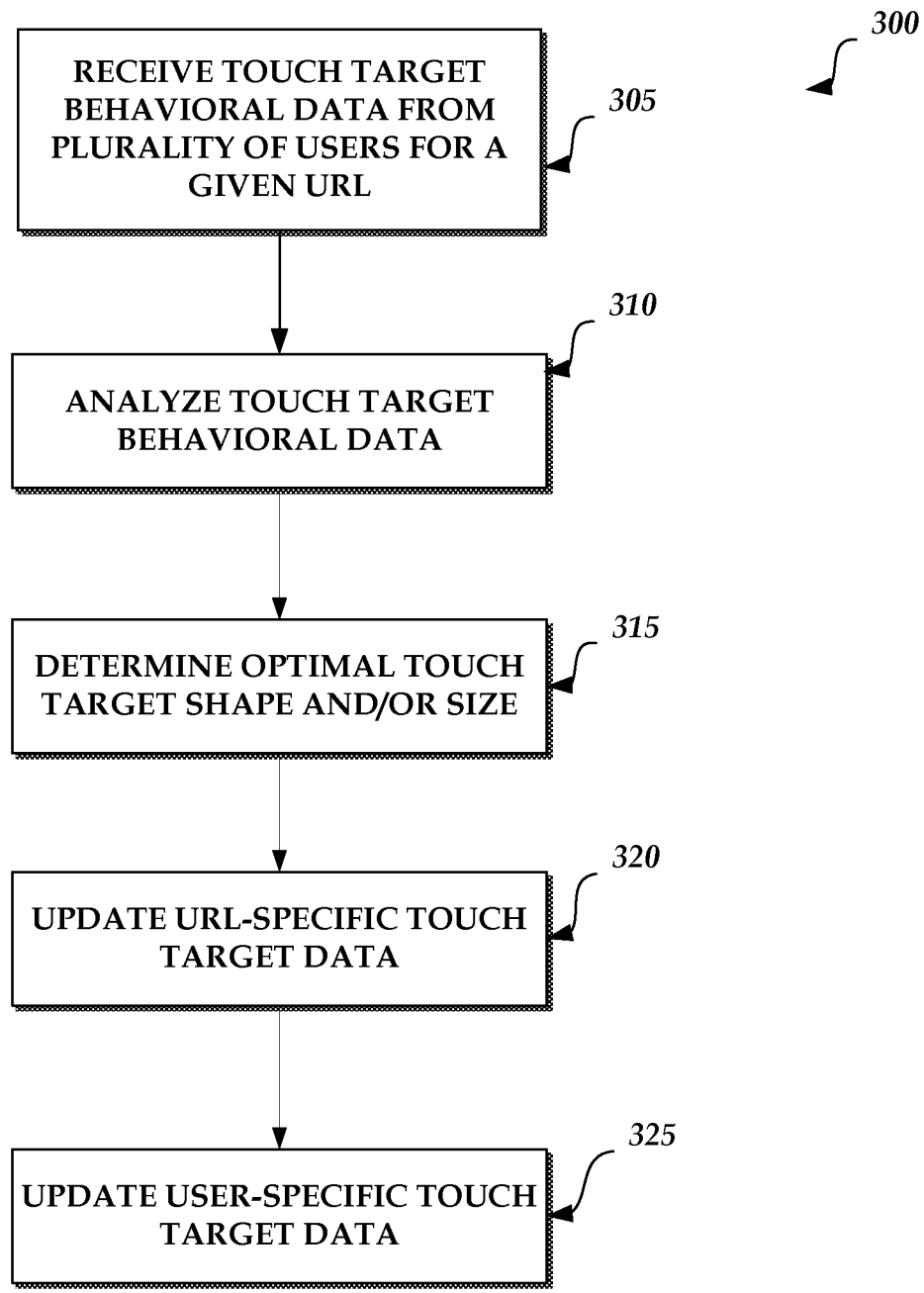
FIG. 3 schematically illustrates a logical flow diagram for receiving touch target feedback involving the touch target optimization system of FIG. 1.

FIGS. 2 and 3 are logical flow diagrams for various embodiments of touch target optimization routines. In some implementations, the routines are performed by embodiments of the touch target optimization system 100 described with reference to FIG. 1 or by one of its components, such as the touch target adjustor 101.

FIG. 2 is a logical flow diagram for a touch target optimization scenario involving the touch target optimization system of FIG. 1. Beginning at block 205, the touch target optimization system 100 retrieves a web page requested by a user device 130. At block 210, the touch target optimization system 100 may optionally retrieve URL-specific touch target data associated with the page, such as from the URL-specific touch target data repository 115 of FIG. 1. This URL-specific data may, for example, be based on the monitored behaviors of users who have accessed this URL, and/or may be based on past analysis of the associated content. At block 215, the touch target optimization system 100 may optionally retrieve user-specific touch target data, such as from the user/device specific settings and/or behavioral data repository 120 of FIG. 1.

Continuing to block 220, the touch target optimization system 100 determines the available space for touch targets. The available space for touch targets may be determined, for example, based on the touch screen display size and/or resolution for the requesting touch screen device. The available space may also be determined based partly or wholly on the content of the web page, including the display size of the web page and/or the user-selectable elements of the web page to which touch targets are to be assigned.

At block 225, the touch target optimization system 100 determines the shape and/or size of the touch targets for the user-selectable elements of the web page. The shape and/or size of the touch targets may be determined at least in part by the available space determined at block 220. For example, if the touch target optimization system 100 determines that there is a relatively small amount of available space, the touch targets may be adjusted to be proportionally smaller in accordance with the available space. In another example, if the touch target optimization system 100 determines that there is a relatively small amount of available space, some touch targets may be adjusted to be larger than others based on certain criteria, in order to optimize the small available space for the higher priority touch targets.

Also at block 225, the determination of the shape and/or size of the touch targets may also be based on, for example, the data optionally retrieved at blocks 210 and 215. For example, certain touch targets associated with a specific URL may be automatically optimized for a specific size and/or shape based on the URL-specific touch target data. In another example, certain touch targets may be automatically optimized for a specific size and/or shape based on configuration settings and/or monitored behaviors associated with the requesting user device.

Continuing to block 230, once the touch target optimization system 100 determines the shape and/or size of the touch targets for the web page, the web page content is adjusted to correspond to the determined touch targets. The web page content may be adjusted, for example, by re-positioning certain elements of the web page (e.g. by moving links and/or buttons in accordance with the determined shape and/or size of their corresponding touch targets), and/or by modifying the sizes of certain display elements. In some implementations, additional web page content, such as dynamic HTML or JavaScript, may be added to the web page to dynamically adjust the web page content on the client touch screen device 130 with a browser configured to execute the dynamic HTML or JavaScript. Further, JavaScript or other browser-executable code could be added that does one or both of the following: (1) adjusts the size of a display element if and when the user performs a particular action on the page, (2) reports back to the optimization system 100 data regarding various types of interactions, such as zoom events, failed link selection events, etc.

Finally, at block 235, the adjusted web page content is transmitted by the touch target optimization system 100 to the requesting user device 130 for display by the browser 135. Where a special browser or browser plug-in is used (i.e., one that is specially designed to interact with the touch target optimization system 100), the system 100 may send web page metadata that indicates how certain touch targets should be adjusted or displayed. This metadata may be embedded in the page itself, or may be sent as a separate file.

Although not shown in FIG. 2, the web page content may also be dynamically adjusted by the touch target optimization system 100 and/or browser 135 in response to the user's interactions on the page. Thus, after the web page is transmitted and displayed as described above, touch targets may be dynamically resized and/or reshaped based on the user's actions. For example, if a user is viewing a web page with a search box, the size and/or shape of a touch target corresponding to the "Search" button or link may be increased in response to the user entering search text or performing some other action which may indicate an increased likelihood that the user will select the "Search" button or link.

FIG. 3 schematically illustrates a logical flow diagram for analyzing touch target feedback involving the touch target optimization system 100 of FIG. 1. Beginning at block 305, the touch target optimization system 100 receives touch target behavioral data from a plurality of users/devices for a given URL. In some implementations, the touch target behavioral data may, for example, be from a particular user for a given URL, or from a particular client device for a given URL. The touch target behavioral data may include data such as the number of unsuccessful attempts to activate a touch target before the touch target was successfully activated, the type of gestures used by the user for both the unsuccessful and successful attempts, and other data reflective of how difficult particular display elements are to select.

At block 310, the touch target optimization system 100 analyzes the touch target behavioral data. In some implementations, the analysis may be performed according to the method as described at blocks 220, 225, and 230 of FIG. 2. In some implementations, the analysis may include the use of learning algorithms which are configured to learn the patterns of a user or users over time, including, for example, level of accuracy, whether the user has a light or heavy touch, and the types of gestures most frequently used by the user. The analysis may also be based in part on user settings or preferences Continuing to block 315, the touch target optimization system 100 determines the optimal touch target shape and/or size based at least in part on the behavioral data analyzed at block 310. For example, the touch target optimization system 100 may determine that the touch target size associated with a particular link should be increased due to the high frequency with which users fail to accurately select the link, and/or based on the high frequency with which users zoom-in on the link before making the selection. The optimal shape of the touch targets may also be determined based, for example, on the type of gesture (e.g. a single-finger touch, a single-finger swipe, a multiple-finger touch, a multiple-finger swipe, or other various shape-specific gestures) used by the user(s) to activate a user-selectable element.

At block 320, the touch target optimization system 100 updates the URL-specific touch target data (e.g. the URL-specific touch target data 115 of FIG. 1) with, for example, the touch target behavioral data received at block 305 and/or the optimal touch target shape and/or sizes determined at block 315.

Finally, at block 325, the touch target optimization system 100 may also update the user-specific touch target data (e.g. the user/device specific settings and/or behavioral data 120 of FIG. 1) with, for example, the touch target behavioral data received at block 305 and/or the optimal touch target shape and/or sizes determined at block 315.

Examples Web Pages

Figure 4:
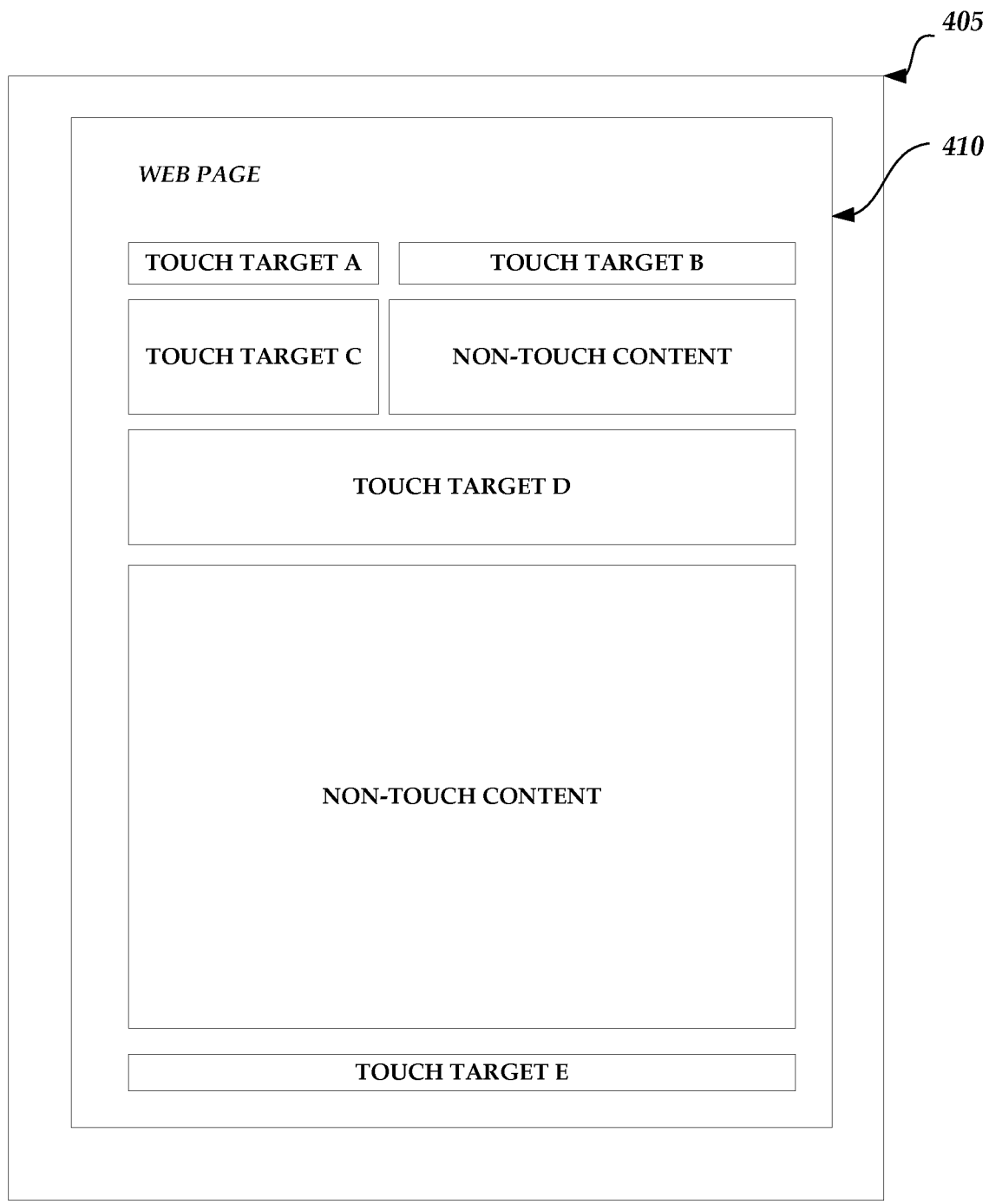
FIG. 4 is an example user interface which illustrates one possible touch target optimization output involving the touch target optimization system of FIG. 1.

FIG. 4 illustrates the format of an example user interface (web page), and illustrates one possible touch target optimization output involving the touch target optimization system of FIG. 1. FIG. 4 represents several touch targets A, B, C, D, and E corresponding to user-selectable elements on a web page 410 displayed on a touch screen 405. In this embodiment, the touch targets A-E are represented by rectangle-shaped boundary boxes, with each touch target corresponding to a distinct user-selectable element (e.g. a link or a button) on the web page. In some embodiments, the touch targets A-E may be represented by different shapes or patterns depending on the optimal touch target shape and size determined, for example, in accordance with the process described in FIGS. 2 and 3. In the example of FIG. 4, the touch target optimization system 100 has determined that touch targets C and D should be larger than touch targets A, B, and E. It may be that the underlying user-selectable elements for touch targets C and D are similarly larger than the underlying user-selectable elements for touch targets A, B, and E. Or, each of these underlying user-selectable elements may be the same size, but the touch targets C and D are larger based on, for example, a user or device settings (e.g. particular user-selectable elements, such as those of touch targets C and D, should automatically have larger touch targets), learned user preferences (e.g. users generally select touch targets C and D more frequently than they touch targets A, B, and E), or any of the other criteria as described herein.

Figure 5:
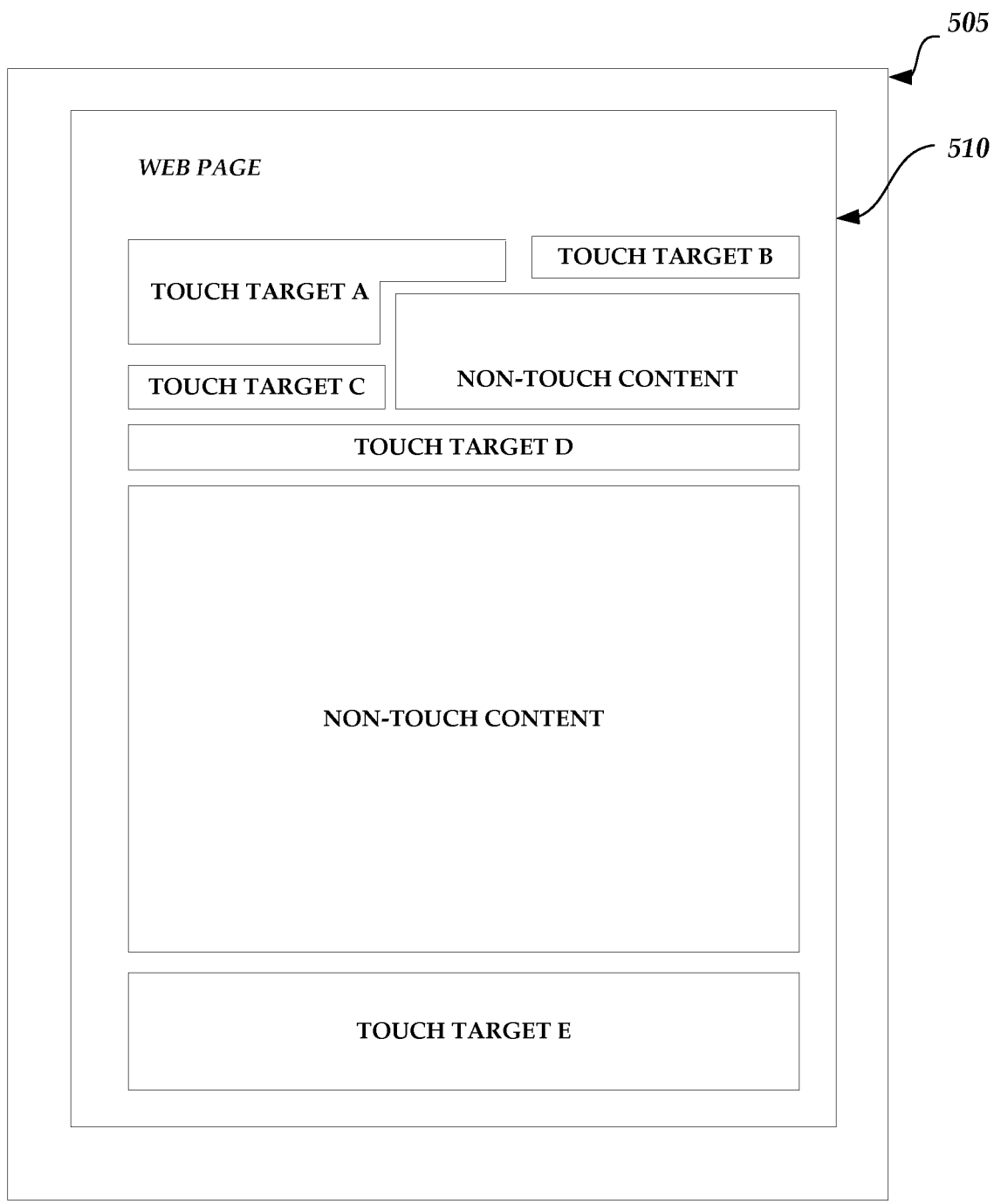
FIG. 5 is an example user interface which illustrates another possible touch target optimization output involving the touch target optimization system of FIG. 1.

FIG. 5 illustrates another possible touch target optimization output involving the touch target optimization system of FIG. 1. FIG. 5 represents several touch targets A, B, C, D, and E corresponding to user-selectable elements on a web page 510 displayed on a touch screen 505. In this embodiment, and in contrast to the example of FIG. 4, the touch target optimization system 100 has alternatively determined that touch targets A and E should be relatively larger than touch targets B, C, and D. Further, the touch targets may overlap or overlay non-touch target content, or, as FIG. 5 illustrates, have adjusted shapes to wrap around non-touch target content and/or adjacent touch targets. For example, the boundary box of touch target A wraps around the boundary box of the non-touch content adjacent to touch target C. While this illustration makes the adjusted shape visualization clear, it is similarly possible that, for example, the upper boundary of touch target E overlaps with the non-touch content above. As in FIG. 4, the size and/or shape of the touch targets A-E may be based on, for example, a user or device settings (e.g. particular user-selectable elements should automatically have larger touch targets), learned user preferences (e.g. users select touch targets A and E more frequently than they touch targets B, C, and D), or any of the other criteria described herein. Thus, FIG. 5 illustrates how the same or a similar web page may be configured with different touch target optimization depending on various criteria.

Alternative Examples of Touch Target Optimization Systems

Figure 6:
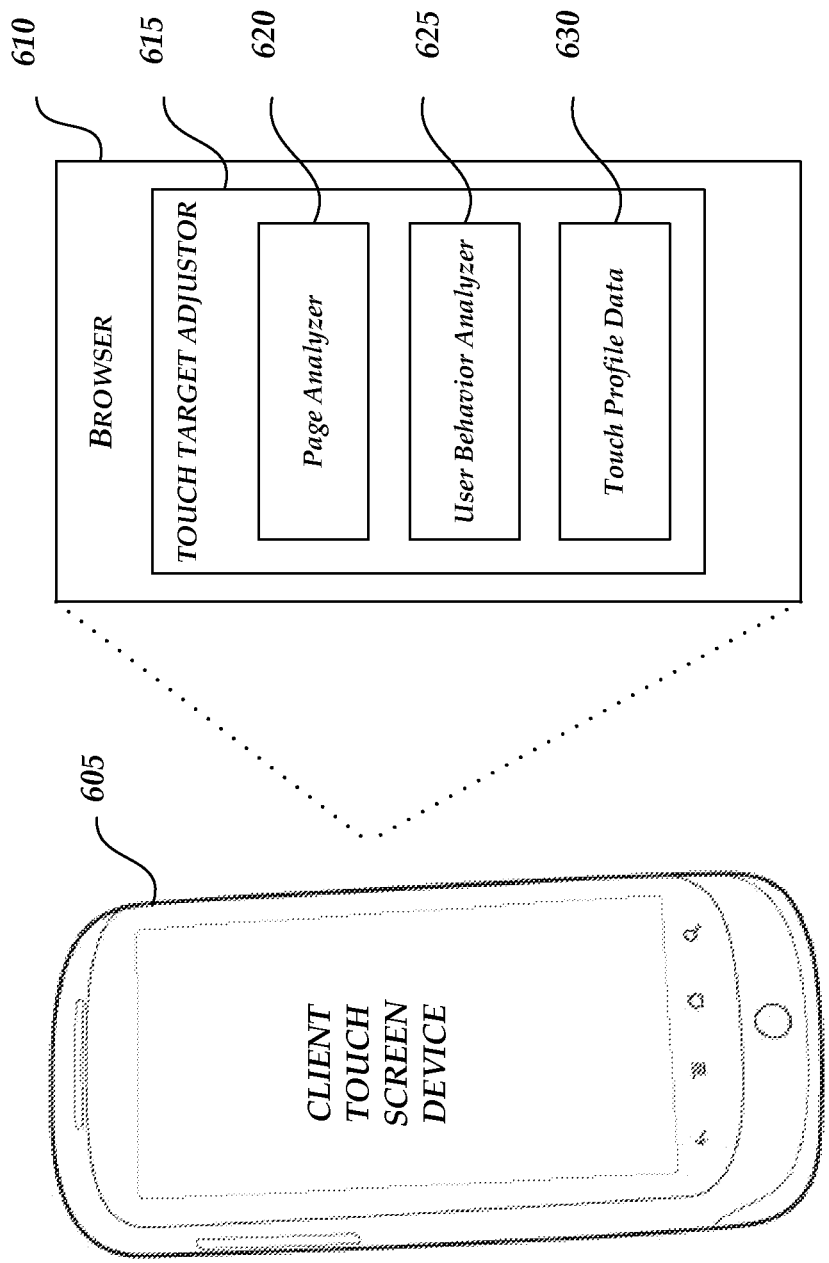
FIG. 6 illustrates an embodiment in which the touch target adjustment functionality resides entirely on the client device.

FIG. 6 illustrates an embodiment in which all of the components of the touch target optimization system reside on the user device 605, preferably as part of a browser 610. In this embodiment, the user device 605 may, but need not, use a proxy server to access web sites. As will be apparent, all of the types of touch target adjustments described above can be implemented in this embodiment.

As illustrated in FIG. 6, the browser 610 includes a touch target adjustor 615. The touch target adjustor 615 may include multiple components or modules configured to provide the features described herein. For example, as depicted in FIG. 6, the touch target adjustor 615 comprises a page analyzer 620, a user behavior analyzer 625, and touch profile data 630. The touch target adjustor 615 may be a native component of the browser 610, or may be a browser plug-in or add-on that can be downloaded and installed by users.

In this embodiment of FIG. 6, when the browser 610 retrieves a page over a network from a web site/server, the touch target adjustor 615 determines what touch target modifications, if any, to make on the page, and makes these adjustments as the page is rendered. For example, the touch target adjustor 615, via the page analyzer 620, may analyze the web page to determine, for example, the number and type of user-selectable elements to be rendered as touch targets by the browser 610. The touch target adjustor 620 may also access touch profile data 630, which may include, for example, URL-specific touch target data, user-specific touch target behavioral data or settings, and/or touch target data for the particular client touch screen device 605. In some implementations, the touch target adjustor 620, via the user behavior analyzer 625, may collect touch target feedback and other data specific to a user of the device 605, or to all users of the device 605. The analyzed user behavior data may then be stored with the touch profile data 630 and/or updated over time to improve the touch target optimization process and the user's experience using the client touch screen device 605.

In some implementations, when the browser 610 requests a URL, the user device 605, via the touch target adjustor 615, may access a metadata server (not shown) to retrieve metadata for this URL. This metadata may directly or indirectly specify touch target modifications to be made on the requested page, and may be based partly or wholly on an analysis of the behaviors of users who have accessed this page, as described above.

Variations

As will be apparent, many variations of the touch target optimization systems 100, 615 described above are possible. For example, the disclosed touch target adjustment functions could be embodied within, or used with, other types of mobile applications, including news applications, e-book reader applications, word processing applications, email applications, social networking applications, and other types of applications that retrieve and display interactive content.

Further, some or all of the disclosed touch target adjustment functions can be implemented within a mobile device operating system. In such embodiments, the underlying touch target adjustment features may be made available to, or used with, any number of mobile applications that run on the user device 605. In some cases, the operating system may not actually increase the display sizes of the associated display elements, but may interpret screen touch events such that the touch targets associated with these display elements are enlarged relative to their original sizes. All of the above-described factors and criteria for adjusting touch target sizes and shapes may be used for this purpose.

The touch target optimization system may be configured to operate with any type of touch-based screen or device, including, but not limited to, resistive, surface acoustic wave, capacitive, infrared, optical imaging based, dispersive signal type, acoustic pulse recognition, and touch screens with or without haptic feedback. Touch target optimization can be based on screen factors such as screen resolution and pixel density (e.g., dots per inch (DPI)). The touch target optimization system may also be implemented with systems and software for recognizing touch-based gestures.

Although the examples and features herein are described in the context of touch-based screens or devices and touch-based user interactions, the touch target optimization system may also be implemented for non-touch based screens or devices and non-touch based user interactions, including, for example, mouse, keyboard, joystick, remote control, and/or other user input devices, eye movement detectors, motion detectors, and other systems in which users provide input to select display elements in a user interface.

As described above, the touch target optimization system 100 can be implemented with one or more physical servers or computing machines, such as several computing machines interconnected via a network. Thus, each of the components depicted in the touch target optimization system 100 can include hardware and/or software for performing various features. The executable code modules of the touch target optimization systems 100, 610 can be stored on any type of non-transitory storage system or device (e.g., solid state memories, hard disk drives, etc.).

The processing of the various components of the touch target optimization system 100 can be distributed across multiple machines, networks, and other computing resources. The various components of the touch target optimization system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Each of the processes, methods, and algorithms described in the preceding sections may be embodied in, and fully or partially automated by, code modules executed by one or more computers, computer processors, or other machines configured to execute computer instructions. The code modules may be stored on any type of non-transitory computer-readable medium. The processes and algorithms may alternatively be implemented partially or wholly in application-specific circuitry. The results of the disclosed analyses and process steps may be stored, persistently or otherwise, in any type of non-transitory computer storage such as, e.g., volatile or non-volatile storage.

The various features, processes, and decision criteria described above may be used independently of one another, or may be combined in various ways. All possible combinations and subcombinations are intended to fall within the scope of this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the scope of protection.

What is claimed is:

1. A computer-implemented method, comprising:
   programmatically by a touch target modification system that comprises one or more computing devices:
   receiving and storing user interaction data reported by each of a plurality of user devices having touch screens, the user interaction data specifying user interactions with a network-accessible page on the user devices, the network-accessible page including a user-selectable display element, the user interactions including at least (1) zoom interactions in which users zoom-in on the page, and (2) selection actions in which users select the user-selectable display element;
   detecting, based on a programmatic analysis of the user interaction data, a problem experienced by users in selecting the user-selectable display element, wherein detecting the problem comprises detecting a recurring pattern in which users zoom-in on a portion of the page containing the user-selectable display element prior to selecting the user-selectable display element; and
   selecting, based on the detected problem, an adjustment to be made to a touch target associated with the user-selectable display element to facilitate selection of the user-selectable display element, the adjustment including a modification to a size of the touch target relative to sizes of other display elements on the page.

2. The method of claim 1,
   wherein the plurality of user devices include user devices of a plurality of device types;
   wherein the user interaction data is stored in association with user device type information that distinguishes between the plurality of device types; and
   wherein the selected adjustment is specific to a particular device type of the plurality of user device types and is based on a determination that the problem selecting the display element is encountered by users of the particular device type.

3. The method of claim 1, wherein the plurality of user devices include user devices of a plurality of device types, and wherein the adjustment is specific to a particular one of the device types.

4. The method of claim 3, further comprising receiving a request from a user device for the page, and responding to the request by at least:
   determining that the user device is of the particular device type; and in response to determining that the user device is of the particular device type, causing the page to be delivered to the user device with the adjustment.

5. The method of claim 1, wherein the interaction data is reflective of actions of a plurality of users, and the adjustment is specific to a selected subset of the users.

6. The method of claim 1, wherein the adjustment comprises an enlargement of the touch target.

7. The method of claim 6, wherein the adjustment is selected based at least partly on a determination of what percentage of users zoom-in on the page before selecting the user-selectable display element.

8. The method of claim 1, wherein detecting the problem further comprises detecting failed attempts by users to select the user-selectable display element.

9. The method of claim 1, further comprising instructing a browser component running on a user device to make the adjustment to the touch target on the user device.

10. The method of claim 1, further comprising, by a proxy server system that operates as an intermediary between user devices and content servers, making the selected adjustment to the touch target after retrieving the page from a content server.

11. The method of claim 1, wherein detecting the problem comprises determining a frequency with which users zoom-in on the user-selectable display element before selecting the user-selectable display element.

12. A system, comprising:
a touch target optimization system comprising one or more computing devices; and
a browser component configured to run on user devices that include touch screens and to report, to the touch target optimization system, user interaction data reflective of user interactions with network-accessible pages, the user interactions including at least zoom interactions and display element selection actions;
wherein the touch target optimization system is configured to analyze the reported user interaction data to identify display element selection problems encountered by users in selecting display elements of the network-accessible pages, and to use the detected display element selection problems to select touch target adjustments to be made to reduce the display element selection problems, the display element selection problems detected based on recurring patterns, including a pattern in which users zoom-in on a page before selecting a display element on the page, the selected touch target adjustments including an adjustment in which a size of a touch target associated with a user-selectable display element on a page is increased relative to sizes of other display elements on the page.

13. The system of claim 12, wherein the touch target optimization system is configured to store the reported user interaction data in association with each of a plurality of user device types, and is configured to select a touch target adjustment that is specific to a particular one of the user device types.

14. The system of claim 12, wherein the recurring patterns include patterns in which users attempt but fail to select the user-selectable display element.

15. The system of claim 12, wherein the touch target optimization system is configured to determine what percentage of users zoom-in on the page before selecting the user-selectable display element, and use the percentage to determine whether to make a touch target adjustment.

16. The system of claim 12, wherein the touch target optimization system is part of a proxy server system, and is configured to modify requested pages to cause the selected touch target adjustments to be made.

17. The system of claim 12, wherein the browser component is responsive to a user zooming in on, and then selecting, a link with a user device by reporting to the touch target optimization system at least the following event data: (1) an identifier of the user device or a type of the user device, (2) an identifier associated with the link, (3) a zoom level at a time of the selection of the link, and (4) whether the user failed to properly select the link.

18. The system of claim 17, wherein the event data further includes a size of a touch target of the link.

19. The method of claim 1, wherein the user interaction data comprises, for an interaction in which a user of a user device zoomed-in on and then selected a link: (1) an identifier of the user device or a type of the user device, (2) an identifier associated with the link, (3) a zoom level at a time of the selection of the link, and (4) whether the user failed to properly select the link.

* * * * *